United States Patent [19]

Dumas

[11] 3,964,512
[45] June 22, 1976

[54] SELF-SUPPORTING PIPE BOOM

[76] Inventor: Odilon Dumas, 964 Papineau St., Laval, Quebec, Canada

[22] Filed: Aug. 26, 1974

[21] Appl. No.: 500,686

[30] Foreign Application Priority Data

Sept. 10, 1973 United Kingdom............... 42512/73

[52] U.S. Cl............................... 137/615; 214/522; 302/64
[51] Int. Cl.² .......................................... F16L 3/00
[58] Field of Search................. 137/615; 214/83.28, 214/522; 302/64

[56] References Cited
UNITED STATES PATENTS

| | | |
|---|---|---|
| 3,217,748 | 11/1965 | Harper............................... 137/615 |
| 3,221,772 | 12/1965 | Arntzen............................. 137/615 |
| 3,451,427 | 5/1969 | Dollinger........................... 137/615 |
| 3,459,222 | 8/1969 | McElroy............................. 137/615 |
| 3,685,543 | 8/1972 | Schwing et al...................... 137/615 |
| 3,707,990 | 1/1973 | Schaible et al..................... 137/615 |

*Primary Examiner*—William R. Cline
*Assistant Examiner*—H. Jay Spiegel
*Attorney, Agent, or Firm*—Larson, Taylor and Hinds

[57] ABSTRACT

A pipe boom which can be used in conjunction with a slurry pump for delivering and placing concrete. The pipe boom has an upstanding riser assembly on a turret, at least two pivotally interconnected pipe sections that form a foldable arrangement, suitable linear actuators for erecting the pipe sections and pivotal connections for interconnecting the pipe sections and the riser assembly by means of rigid conduits.

10 Claims, 5 Drawing Figures

SELF-SUPPORTING PIPE BOOM

This invention relates to the pumping of concrete in a liquid form through pipelines and in particular to a turret mounted self-supporting orientable pipeline in the form of a boom having at least two articulated joints suitable for mounting on a truck or a trailer.

It is known to deliver concrete in a liquid form to a pouring site by means of a pipeline. Concrete is pumped through a pipeline by means of a special abrasive slurry pumping assembly mounted on a frame. Such apparatus may be used for pumping concrete up many storeys high. Present concrete pipeline units used for conveying concrete include separate articulated booms which support sections of rigid pipes, and normally have sections of flexible pipe connections between the ends of the rigid pipe sections. These flexible pipe sections tend to wear rapidly due to the abrasive properties of the concrete in a liquid form. Hence, they must be renewed more frequently than the rigid pipe sections used. It has been found that in most cases rigid pipe sections have better wear characteristics than flexible pipe sections and are more economical.

With an articulated boom to support sections of rigid and flexible pipeline, it is found that the pipeline is dead weight, not adding to the strength of the boom sections. Hence present boom designs tend to be heavy and cumbersome requiring a considerable amount of power to articulate and a heavy base to support them. Such units generally must be mounted on a truck whereas a light trailer would be sufficient for a self-supporting pipeline of the present invention.

It is an object of the present invention to provide a light weight self-supporting orientable pipeline suitable for conveying concrete in a liquid form.

This invention provides gooseneck yoke means for pivotally interconnecting the adjacent ends of two self-supporting pipe sections by means of two pair of plates, a hollow pivot means extending through the apertured ends of the two pairs of plates and rigid conduit means serially interconnecting the ends of the pipe sections and extending along the axis of the hollow pivot means with a rotatable coupling or swivel connection centered upon the axis of the pivot means and permitting relative rotation between the two ends of the rigid conduit means.

The invention also provides the combination of two straight pipe sections each terminating with a 90° gooseneck extension, the mouths of the extensions facing one another on a common axis. Rigid straight pipe means extends between the mouths of the extensions and serially connects the pipe sections, and at least one rotatable coupling is used for coupling one of the extensions to the corresponding end of the pipe means. Two pairs of plates are secured to the end portions of the straight pipe sections immediately inwardly of the gooseneck extensions, and the rigid pipe means extends through apertures in the two pairs of plates for pivotally interconnecting same.

The invention further provides a concrete pump and a pipe boom therefor which combines a turret and riser pipe means supported by the turret, two pipe sections, a first connection for coupling the riser pipe means to the inboard end of the first plate section, a second connection for coupling the outboard end of the first pipe section to the inboard end of the second pipe section, and linear actuator means for controlling the angular positions of the pipe sections.

With the foregoing more important objects and features in view, and such other objects and features as may become apparent as this specification proceeds, the invention will be understood from the following description of the accompanying drawings, wherein like characters of reference are used to designate like parts and wherein.

The pipe boom is designed to form an important part of a concrete pump combining a concrete receiving hopper, and a concrete pumping assembly which however have not been illustrated in order to simplify the drawings.

Figure 1:
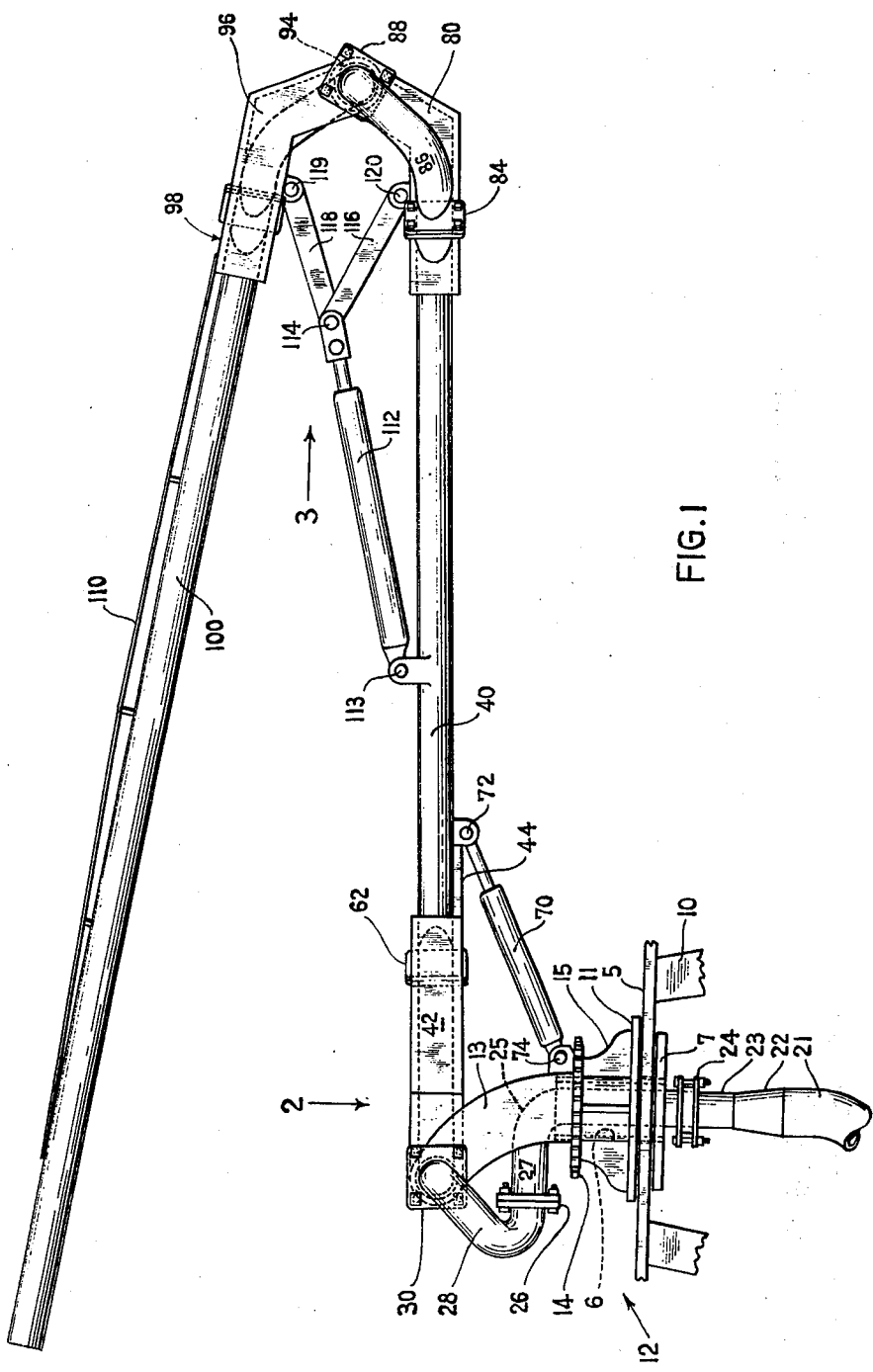
FIG. 1 is a schematic elevational view of a self-supporting orientable pipeline of the present invention having two articulated joints and a rotatable turret; the upper boom section being shown in slightly erected position.
Figure 2:
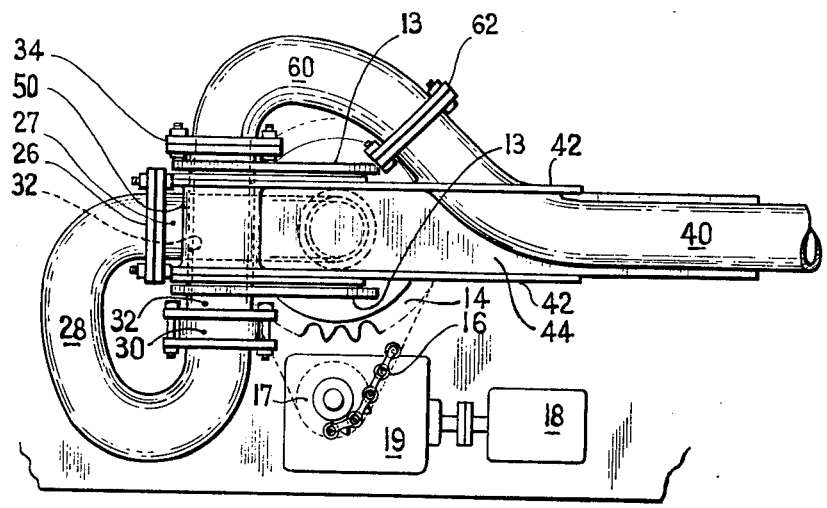
FIG. 2 is a plan view of the articulated joint between the turret and the first pipe section shown at arrow 2 in FIG. 1.
Figure 3:
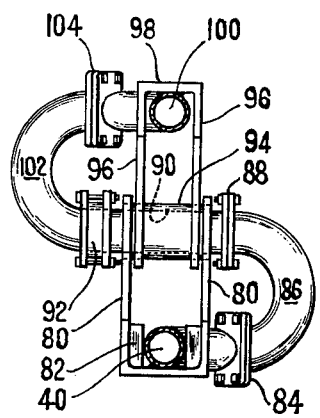
FIG. 3 is an elevational view of the articulated joint between the first and second pipe sections shown at arrow 3 in FIG. 1.

Referring now to FIGS. 1, 2 and 3, a frame member 10 of a truck or trailer is shown in part in FIG. 1 having a bearing plate 11 mounted thereon to support the turret assembly 12 of a self-supporting orientable pipeline. Between the bearing plate 11 and the frame 10, a suitable thrust bearing is located which permits the turret to rotate. The bearing may consist of a table 5 with a central hole through which sleeve 6 projects. A lower plate 7 is welded to the lower end of sleeve 6. The turret assembly 12 has two parallel side plates 13 which extend down to rest on the bearing plate 11 and are welded or otherwise secure to sleeve 6. Means is provided for feeding grease between plates 7, 11 and table 5. Side plates 13 have a curved upper portion to form a pivot axis at the upper end or the first articulated joint or gooseneck yoke "2" of the boom assembly. A large sprocket wheel 14 is attached to the two side plates 13 located directly above the bearing plate 11. Gusset plates 15 aid in stiffening the turret assembly below the large sprocket wheel 14 and support the two side plates 13 from the bearing plate 11. A chain 16 (shown in FIG. 2) extends around the large sprocket wheel 14 and driven by a drive sprocket 17. A motor 18, preferably hydraulic, drives a worm gear box 19 connected to the drive sprocket 17. The drive mechanism for rotating the turret 12 is mounted on the frame assembly of the trailer or truck supporting the turret.

Pipe 21 which extends from the concrete pumping assembly (not shown) is preferably a constant diameter steel pipe welded to a shallow tapering pipe reduction 22 which leads to a smaller diameter pipe section 23. In a particular pipe boom according to this invention, pipe 21 is 6 inches O.D. and pipe 23 is 4 inches throughout the entire length of the pipeline.

The self-supporting pipeline is designed to have no sharp elbows or other restrictions, thus to minimize flow impedance. Riser pipe 23 extends vertically upwards at the axis of rotation of the turret assembly 12.

Before entering the turret, the pipeline has a first swivel connection or rotatable coupling 24 of the type shown in FIGS. 4 and 5 and to be described later. Above the first swivel connection 24 the pipeline extends upwards through the center of the bearing plate 11 between the two side plates 13 and has a 90° curve 25 terminating at a first flange connection 26. As shown in FIG. 1, the end of curved pipe section 27 which extends between riser 23 and flange connection 26 points to the left of the figure between the two side plates 13 and in the same direction as the curve of the upper portion of the side plates 13. The first flange connection 26 is located below the pivot axis of the first articulated joint of the boom assembly. Curved pipe section 28 of the pipeline extends from the first flange connection 26 to a second swivel connection 30 which is located on the pivot axis of the first articulated joint or yoke 2. A short straight pipe section 32 extends from the second swivel connection 30 through the pivot axis of the first articulated joint between the two side plates 13 and terminates at a second flange connection 34.

Pipe section 40 has two lower side plates 42 which are parallel and fit between the two side plates 13 of the turret assembly 12. Other plates and stiffeners such as plate 44 are fitted as required to provide a substantial connection, preferably welded, between the inboard end of the lower pipe section 40 and the two side plates 42.

As seen in FIGS. 1 and 2, the pair of plates 42 are mechanically pivoted to the upper ends of plates 13 around an axis which corresponds with the central axis of pipe section 32. A sleeve 50 is welded to side plates 42 which are apertured so as to define a passage for pipe section 32. Pipe section 32 extends beyond side plates 42 through bores in vertical plates 13.

In a different embodiment where swivel connection 30 and the flange connection 34 have been changed position so that swivel connection 30 is at the downstream end of pipe section 32, vertical plates 13 can be welded to pipe section 32 for mor strength and better wear but this may complicate servicing.

A curved section of pipe 60 extends from the second flange connection 34 to a third flange connection 62 located adjacent to one of the side plates 42 of the lower pipe section 40. Pipe section 40 extends from the third flange connection 62, passes through the adjacent side plate 42, bends approximately 45°, and forms the first boom section of the pipeline, the pipe and the boom section being one and serving two purposes: the passage of concrete and structural support.

The raising and lowering of the first boom section is performed by a linear actuator, namely a hydraulic cylinder 70 positioned beneath the inboard end of the lower pipe section 40 and attached at 72 and to the turret assembly as at 74.

The connection between the lower boom section and the upper boom section is by means of an articulated joint or gooseneck yoke 3 illustrated in FIGS. 1 and 3. Parallel upper side plates 80 are formed into a box with appropriate spacers 82 and welded to the outboard end of the first pipe section 40. The spacers 82 set the distance between the side plates 80 to be approximately the same as the distance between the vertical plates 13 in the turret assembly 12. Side plates 80 are offset at their free end so the articulated joint is not in line with either boom section. Pipe section 40 extends out through one of the side plates 80 in a bend of approximately 45° to terminate at a fourth flange connection 84. A curved pipe section 86. A curved pipe section 86 extends from the fourth flange connection 84 to a fifth flange connection 88 which is located on the pivot axis of the second articulated joint between the first and the second boom sections of the pipeline. A short straight section of pipe 90 extends from the fifth flange connection 88 along the pivot axis of the second articulated joint i.e., through apertured plates 80 and terminates at a third swivel connection 92 of the type shown in FIGS. 4 and 5 to be described later. In a particular embodiment, the short section of pipe 90 may be welded to the side plates 80 although, as noted above, this complicates disassembly of the joint. A spacer sleeve 94 surrounds the intermediate section of pipe 90 and is preferably welded to the side plates 80. A further pair of side plates 96 are welded together with stiffener plate 98 as required to the inboard end of the upper pipe section 100. Side plates 96 are offset at their free ends and fit within the two side plates 80 of the first boom section, pivoting about the spacer sleeve 94. The offset pivot axis of the second articulated joint permits the second boom section to lie flush and parallel with the first boom section but slightly spaced apart. From the third swivel connection 92 a short curved section of pipe 102 extends to a sixth flange connection 104 which in turn is connected to the inboard end of upper pipe section 100 passing through the adjacent side plate 96, bending approximately 45° and forming the upper boom section. A stiffener brace 110 may be provided along the top of the upper pipe section 100 depending on the length thereof but normally it is not necessary. The movement between the first and the second boom sections is performed by a hydraulic cylinder 112 and an appropriate linkage system. Cylinder 112 is anchored at 113 on the lower pipe section 40 and is pivotally connected to the common point 114 of links 116, 118 which are pivotally connected at their other end to the pairs of plates 80 and 96 respectively as at 119, 120.

Figure 4:
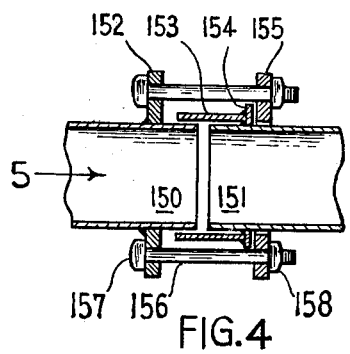
FIG. 4 is a longitudinal cross-section through a swivel connection in the pipeline.
Figure 5:
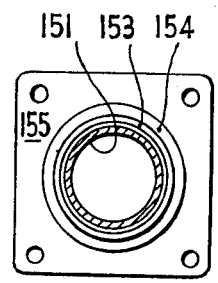
FIG. 5 is an end view of the right hand portion of the swivel connection shown at arrow 5 in FIG. 4.

The swivel connector or coupling shown in FIGS. 4 and 5 is comprised of standard pipe sections and steel plate, does not require machining and has sufficient clearance for a first pipe 150 to rotate relative to a second pipe 151. Initially in some swivel connectors, concrete in a liquid form tends to leak from the joint, but solid particles in the concrete such as sand, stone dust or cement accummulate to form a seal which does not leak when movement occurs in the connector or rotatable coupling. A first plate 152 preferably square in shape is welded a short distance from the end of the first pipe 150. A sleeve 153 fits over the ends of both pipes and preferably has a clearance of 1/16'' between the internal diameter of the sleeve 153 and the outside diameter of the first pipe 150. The sleeve 153 is attached to the second pipe 151 preferably by welding to an annular flange 154 which in turn is welded to pipe 151. A second plate 155 preferably square having the same outside dimensions as the first plate 152 has a central hole larger than the outside diameter of the second pipe 151, fits over the second pipe 151 and is connected to the first plate 152 by means of four bolts 156 which have a head 157 at one end and a threaded end with a nut 158 at the other end. However bolts 156 could be replaced by quick disconnect pins each having a wedge-shaped lock at the end opposite head 157 for easier dismantling. The annular ring 154 together with the first plate 152 and second plate 155 held a predetermined distance apart, prevent the second pipe 151 from separating from the first pipe 150.

It has been found that wear from the concrete passing through the pipeline tends to occur more in the curved sections than in the straight sections, consequently all the curved sections have flange connections or swivel connections at the ends so they may be removed and replaced as required. At the tip of the upper boom section a connection (not shown) may be made for a flexible pipe if this is required. Alternatively, there may be a third boom section attached by means of an articulated pivot joint arrangement similar to that between the first and second boom sections. In such a case, the third boom section might be arranged to fold underneath the second boom section when stowed. However for standardizing components, the Z-shaped folding configuration is preferred. In some instances, the pump has sufficient power to pump up to 40 storeys high. If such a height is required, the top of the boom may be coupled with other pipe sections supported by a building or temporary structure located for the purpose of pumping concrete to a pouring site. The controls for operating the boom are preferably manual hydraulic control valves (not shown) located at some convenient place on the trailer or truck.

With reference to FIGS. 1 and 2, it will be seen that the four 90° bends in the pipeline between riser pipe 23 and swivel coupling 30 could be reduced to two 45° curves and one 90° bend by extending pipe section 25 through one of vertical plates 13 instead of passing around it. This embodiment, which is not illustrated, may however require stiffening of the vertical plates 13 especially the apertured one. Thus, the gooseneck yoke or articulation shown in FIG. 2 is quite similar to the one shown in FIG. 3, each combining two pairs of plates (13, 42), (80, 96) secured to the adjacent ends of the respective pipe sections (25, 40) (40, 100), and pivotally connected to one another, hollow pivot means (32), (90) that extends through the four plates along their pivot axis, a first gooseneck extension (28), (86), a second gooseneck extension (60), (102) and a rotatable coupling (30), (92) at one end of hollow pivot means.

In regard to the mechanical pivotal connection of the turret structure with the lower boom section or of the lower and upper boom sections, the elemental structure requires a hollow pivot means that projects through apertures in the four side plates. The hollow pivot means can be the pipeline itself as in FIG. 2 or a sleeve 90 through which the pipeline extends as in FIG. 3.

In the drawings, the flange connections 26, 62, 84, 88, 104 consist of an apertured square plate welded to the end of each pipe element 28, 60, 40 etc., and bolts retaining the flanges together. A seal may be used to prevent loss of water at the flange connections, and in a particular embodiment, it was found sufficient to install a rubber gasket of about 3/16 of an inch thick. However, it is well known in the art of concrete pumps and pipelines to use quick disconnect connectors wherein a circular band latches in place over annular flanges welded to the ends of the pipe elements. This arrangement has not been shown but can be used in place of the illustrated flange connections wherever it is necessary to have frequent access to the inside of the pipeline.

In both cases, it was found possible to use a O-ring as a seal instead of a rubber gasket but it is necessary to ensure that the mating faces of the flanged pipe elements be sufficiently planar and smooth with one surface having a circular groove for receiving the O-ring.

I claim:

1. In a self-supporting pipe boom, gooseneck yoke means for pivotally interconnecting the adjacent ends of two pipe sections, comprising:

a first pair of side plates fixedly secured to the outboard end of a first pipe section on opposite sides thereof, the plates of said first pair projecting away from the intermediate region of said first pipe section and being parallel to one another, a second pair of side plates fixedly secured to the inboard end of a second pipe section on opposite sides thereof, the side plates of said second pair projecting away from the intermediate region of said second pipe section and being parallel to one another, a circular aperture in each one of said plates of said first and second pairs in the free ends thereof, said apertures being aligned on an axis normal to the longitudinal axis of each pipe section, hollow pivot means extending through said apertures in said plates for interconnecting said first and second pipe sections a first gooseneck extension leading from the outboard region of said first pipe section to one side of said pivot means and coupled therewith, a second gooseneck extension leading from the inboard region of said second pipe section to the other side of said pivot means and coupled therewith, and rotatable coupling means centered upon the axis of said hollow pivot means and disposed at one end of said hollow pivot means for permitting relative rotation between said hollow pivot means and one of said gooseneck extensions around the axis of said hollow pivot means.

2. Gooseneck yoke means as defined in claim 1 including sleeve means fixedly secured to the free ends of the side plates of one of said pairs for defining a cylindrical passage extending between the circular apertures of said last mentioned pair of side plates, said hollow pivot means closely fitting within said passage and wherein two pipe sections are of equal internal diameter, and wherein the internal diameter of said passage and of said first and second gooseneck extensions are substantially equal to the internal diameter of said pipe sections.

3. Yoke means as defined in claim 1 wherein the free ends of said plates of at least one of said pairs of plates is offset toward the free ends of the plates of the other pair for allowing parallel folding of said two pipe sections with a space therebetween.

4. Yoke means as defined in claim 3 wherein said hollow pivot means is secured to the other one of said pair of side plates for rotation therewith.

5. Yoke means as defined in claim 4 wherein said gooseneck extensions are removeably secured to their respective pipe sections.

6. Yoke means as defined in claim 4 additionally comprising linear actuating means for controlling the relative angular position of said pipe sections, said actuating means consisting of a hydraulic cylinder having anchoring means at one end of said cylinder for pivotally connecting same to one of said pipe sections, a pair of links having a common pivot point and each having its free end pivotally connected to a different one of said pairs of plates, and means for pivotally connecting the other end of said cylinder to said common pivot point.

7. Yoke means as defined in claim 1 wherein said plates are welded to their respective pipe sections.

8. For use in a pipe boom, the combination of two straight pipe sections each terminating with a 90° gooseneck extension, the mouths of said gooseneck extensions lying in two parallel spaced-apart planes and having a common axis, rigid pipe means extending between said mouths for serially connecting said pipe sections, at least one rotatable coupling for coupling one of said mouths to one end of said pipe means, first and second pairs of side plate means for pivotally interconnecting said two pipe sections and for supporting all the load at the pivotal connection of said two pipe sections.

means for securing each side plate means of said first pair to a different one of the two opposite sides of one of said two pipe sections immediately inwardly of said gooseneck extensions, and means for similarly securing said second pair of side plate means to the one of said two pipe sections, said rigid pipe means extending successively through one side plate means of said first pair, both side plate means of said second pair and the second plate means of said first pair. section and upper conduit means leading from said lower pipe.

9. In a portable concrete pump comprising a frame, a concrete receiving hopper on said frame, a concrete pumping assembly feeding on said hopper and a pipeline leading from said concrete pumping assembly for placing concrete, said pipeline being characterized by a turret on said frame having two spaced-apart upstanding plate members supporting said pipeline and controlling the angular position thereof relative to said frame around a vertical axis and further characterized in that said pipeline consists of a riser pipe extending through said vertical axis, a lower pipe section mechanically connected to said turret by means of a first pair of plates secured to opposite sides of the inboard end of said lower pipe section and pivotally connected to said plate members around a first horizontal axis, a second pair of plates extending from the outboard end of said lower pipe section on opposite sides thereof, an upper pipe section, a third pair of plates secured to opposite sides of said upper pipe section on the inboard end thereof and pivotally connected to said second pair of plates around a second horizontal axis, first conduit means serially coupling said riser pipe to the inboard end of said lower pipe section, second conduit means serially coupling the outboard end of said lower pipe section to the inboard end of said upper pipe section, first actuating means for controlling the angular position of said lower pipe section relative to said frame around said first horizontal axis and second actuating means for controlling the angular position of said upper pipe section relative to said first pipe section around said second horizontal axis.

10. A pipe boom consisting of two or more superimposed elongated elements articulated to one another by end connection means for forming an arrangement which folds into a n-shaped configuration and actuating means for controlling the angular position of each element relative to the element immediately therebelow, characterized in that each elongated element consists of a self-supporting pipe section, characterized further in that each end connection means consists of two pairs of plates and pivot means for connecting the free ends of said two pairs of plates and wherein the plates of each pair extend parallel to one another and are welded to opposite sides of the end region of the adjoining pipe sections, and of two curved rigid conduits serially connected to one another by a rotatable coupling and in circuit between said adjoining pipe sections, said rotatable coupling being centered upon the axis of said pivot means, and further characterized in that a second of one of said curved rigid conduits extends through the axis of said pivot means.

\* \* \* \* \*